United States Patent [19]
Nago

[11] Patent Number: 5,870,391
[45] Date of Patent: Feb. 9, 1999

[54] WIRELESS COMMUNICATION SYSTEM USING FREQUENCY HOPPING, AND METHOD OF CONTROLLING THE SYSTEM

[75] Inventor: Hidetada Nago, Yokohama, Japan

[73] Assignee: Canon Kabushiki Kaisha, Tokyo, Japan

[21] Appl. No.: 822,615

[22] Filed: Mar. 20, 1997

[30] Foreign Application Priority Data

Mar. 25, 1996 [JP] Japan .................................. 8-094890
Mar. 11, 1997 [JP] Japan .................................. 9-056595

[51] Int. Cl.$^6$ ........................................................ H04L 1/04
[52] U.S. Cl. ........................... 370/330; 375/202; 370/503
[58] Field of Search .................................... 375/202, 200, 375/201, 203; 370/329, 344, 480, 481, 503, 330, 350, 343; 455/434, 515, 502

[56] References Cited

U.S. PATENT DOCUMENTS

| | | | |
|---|---|---|---|
| 5,381,443 | 1/1995 | Borth et al. | 375/202 |
| 5,394,433 | 2/1995 | Bantz et al. | 375/202 |
| 5,471,469 | 11/1995 | Flammer, III et al. | 370/94.1 |
| 5,504,750 | 4/1996 | Fulghum et al. | 370/95.1 |
| 5,506,863 | 4/1996 | Meidan et al. | 375/202 |
| 5,528,622 | 6/1996 | Cadd et al. | 375/202 |
| 5,537,434 | 7/1996 | Persson et al. | 375/202 |

OTHER PUBLICATIONS

Kim et al., "Contour Coding Based on the Decomposition of Line Segments", Pattern Recognition Letters, vol. 11, No. 3, Mar. 1990, pp. 191–195.

*Primary Examiner*—Chau Nguyen
*Assistant Examiner*—Kenneth Vanderpuye
*Attorney, Agent, or Firm*—Fitzpatrick, Cella, Harper & Scinto

[57] ABSTRACT

A common frequency hopping pattern is used for a control channel containing control information, such as communication control information, e.g., connection and disconnection of wireless communication, in a wireless communication system, thereby reducing the load of a controlling station as well as lowering the price of the controlling station.

36 Claims, 18 Drawing Sheets

FIG. 8

SYSTEM CONTROL CHANNEL (CNT)

| CS | PR | SYN | ID | BF | WA | NF | Rev | CRC | GT |
|----|----|-----|----|----|----|----|-----|-----|-----|
| 8  | 56 | 32  | 64 | 8  | 8  | 8  | 8   | 16  | 33 |

LOGIC CONTROL CHANNEL (LCCH)

| CS0 | CS1 | CS2 | PR | UW | DA | Data | CRC | CF |
|-----|-----|-----|----|----|----|----|-----|-----|
| 8 | 8 | 8 | 56 | 24 | 8 | 128 | 16 | 80 |

DATA CHANNEL

| CF | CS0 | CS1 | CS2 | PR | UW | DA | Data | CRC | GT |
|----|-----|-----|-----|----|----|----|------|-----|-----|
| 80 | 8 | 8 | 8 | 56 | 24 | 8 | 4416 | 16 | 68 |

AUDIO CHANNEL

| CS | PR | UW | T/R | CRC | GT |
|----|----|----|-----|-----|-----|
| 8  | 56 | 24 | 320 | 16  | 32 |

END

| CF |
|----|
| 85 |

WIRELESS COMMUNICATION SYSTEM USING FREQUENCY HOPPING, AND METHOD OF CONTROLLING THE SYSTEM

BACKGROUND OF THE INVENTION

The present invention relates to a wireless communication system using frequency hopping, as well as to a method of controlling this system.

Frequency hopping is a method for performing communication while changing frequencies in accordance with a predetermined rule. The predetermined rule is called "frequency hopping pattern", and the changing frequencies are called "frequency channels".

There are a variety of methods of selecting a frequency hopping pattern. One method is to store frequency hopping patterns in a non-volatile memory, such as a ROM, and use an appropriate frequency hopping pattern selected from among those stored. If there is a controlling station, the controlling station may determine an arbitrary frequency hopping pattern.

Not limited to frequency channels used in frequency hopping communication, same frequency channels are used as control channels since it is necessary to exchange control information; alternatively such as line control information, means for controlling each frequency channel in time division to set a period for communicating control information and a period for communicating data is provided.

Further, in a conventional frequency hopping transmission, as shown in FIG. 17, one frame is divided in time division into a control information period (LCCHT) when a controlling station sends control information to a terminal, a data communication period for communicating audio data and other data (audio channel and data channel), and another control information period (LCCHR) when the terminal sends control information to the controlling station. Further, in the control information period (LCCHT), each frequency which is used in one period of a frequency hopping pattern is assigned to one terminal. Therefore, the terminal with which control information can be exchanged in the control information period (LCCHT) in one frame is fixed. The controlling station transmits information addressed to a terminal with which control information can be exchanged via a frequency channel, and each terminal transmits control information to the controlling station when a frequency channel assigned to the terminal is used in a control information period (LCCHR) in a frame.

However, in the above conventional method, a terminal which can communicate with the controlling station is fixed for each frequency channel used in the frequency hopping pattern, and has to call a destination station via the controlling station when starting communication, and thus the load on the controlling station is very large.

A conventional operation when a terminal 1 is trying to communicate with a terminal 2 is explained below.

1) A terminal 1 notifies the controlling station by control information indicating that terminal 1 wishes to open communication with a terminal 2 in a control information period (LCCHR), using a frequency channel assigned to terminal 1, in a control information period (LCCHR) in a frame.

2) The controlling station notifies terminal 2 of the control information indicating that terminal 1 wishes to open communication with the terminal 2, in a control information period (LCCHT), when a frequency channel assigned to terminal 2 is used in a control information period (LCCHR) in a frame.

3) Terminal 2 sends to the controlling station control information indicating whether it is possible or not to open communication in a control information period (LCCHR) when a frequency channel assigned to terminal 2 is used in a control information period (LCCHR) in a frame regardless of whether or not terminal 2 can communicate or not.

4) In a case where terminal 2 cannot open communication, the controlling station sends to terminal 1 control information indicating that it is not possible to communicate with terminal 2 in the frequency channel assigned to terminal 1.

Further, in a case where terminal 2 can open communication, the controlling station decides on a frequency hopping pattern necessary for communication between terminal 1 and terminal 2, then notifies terminal 1 of the frequency hopping pattern in a control information period (LCCHT), via the frequency channel assigned to terminal 1 as well as notifies terminal 2 of the same information, in a control information period (LCCHT), via the frequency channel assigned to terminal 2.

5) Terminal 1 and terminal 2 communicate using the frequency hopping pattern notified by the controlling station.

In the conventional communication system, the controlling station has to communicate with each terminal via frequency channel assigned to the terminal, and so the load on controlling station is considerably large. Further, it takes time to open communication between terminals. Furthermore, there is a problem in that it is difficult to lower the price of the controlling station.

SUMMARY OF THE INVENTION

The present invention has been made in consideration of the above situation, and has as its object to reduce the load on the controlling station.

It is another object of the present invention to shorten the time required to open communication.

It is still another object of the present invention to lower the price of the controlling station.

Further, it is still another object of the present invention to use a common frequency hopping pattern for communicating control information within a system.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 8 is an explanatory view showing an internal configuration of each channel according to that embodiment;

DETAILED DESCRIPTION OF THE PREFERRED EMBODIMENT

Figure 1:
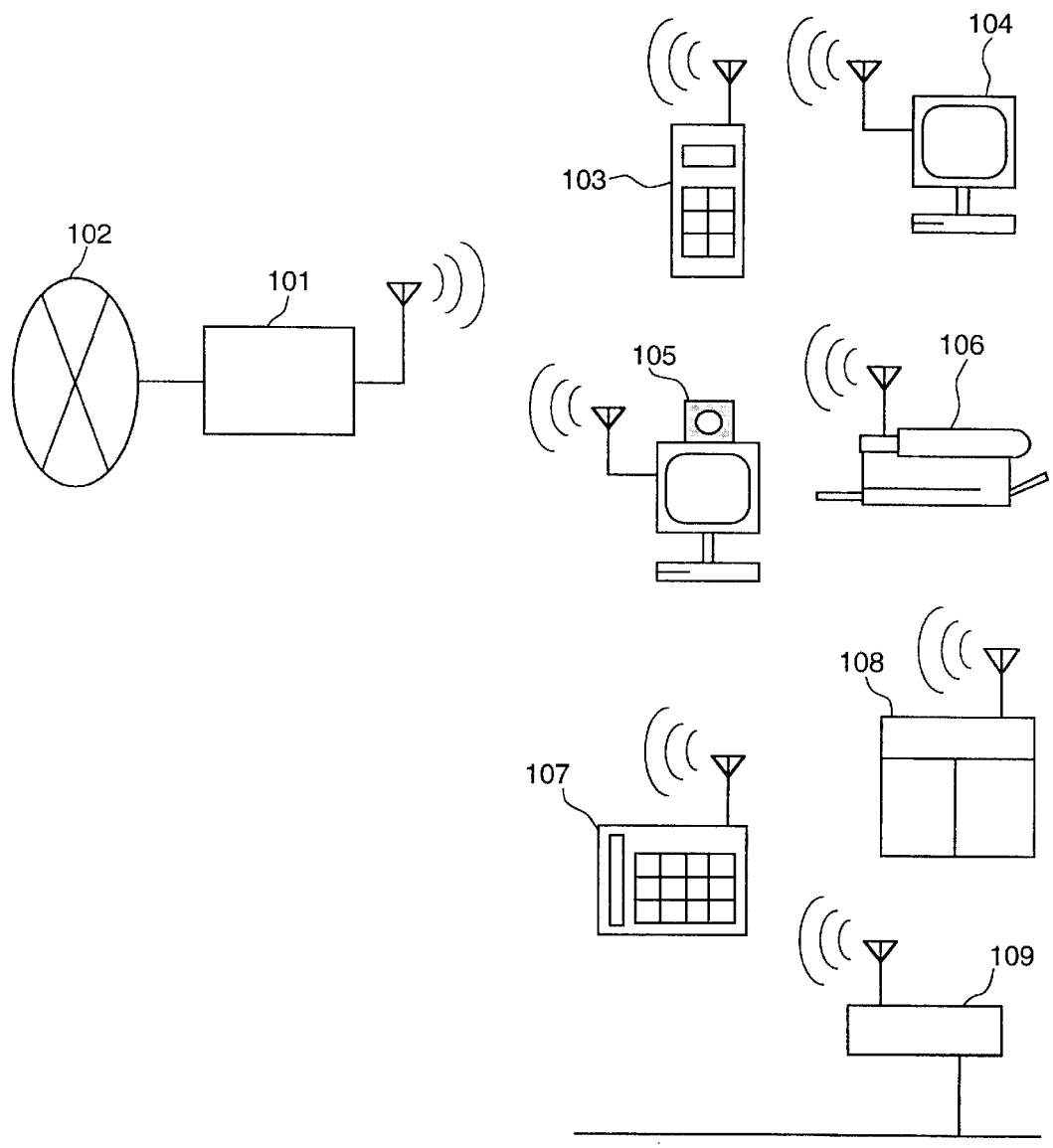
FIG. 1 is an explanatory view showing a configuration of a wireless communication system according to an embodiment of the present invention.

FIG. 1 is an explanatory view showing a configuration of a wireless communication system according to an embodiment.

This wireless communication system comprises a controlling station which administrates and controls communication between terminals in the system and a plurality of terminals. The terminals perform wireless communication in accordance with control data designated by the controlling station by using a communication frame, which will be described later, of the wireless communication system.

Note, that an arbitrary one (or more) of the terminals in the system can be the controlling station.

The wireless communication system includes a network controller 101 which is connected to a public line 102 and provides public network communication services to the terminals in the system, a radiotelephone 103 which exchanges control data or audio data with the network controller 101 to realize audio communication via the public line 102 and to realize extension communication among a plurality of terminals, and wireless data terminals 104 to 109 which communicate control data and other data with the network controller 101.

In the following explanation, the terminals, such as the radiotelephone, the wireless data terminals, and public network gateway are called "wireless terminals 110" (104 to 109) collectively.

A wireless data terminal in this embodiment is a device which is a combination of a terminal (data terminal) or a data input/output device having a function for transmitting data burstly and a wireless adapter for administering wireless communication or an integrated terminal device thereof. Examples of data terminals are a computer 104, a multimedia terminal 105, a printer 106, a facsimile machine 107, a copy machine 108, and a LAN gateway 109, as well as, devices, such as an electronic camera, a video camera, and a scanner (not shown).

The radiotelephone 103 and the wireless data terminal 104 are capable of freely communicating with one another and, at the same time, are capable of accessing a public network 102. This is a major feature of this system.

The details of the construction and operation thereof will now be described.

(1) Radiotelephone

Figure 2:
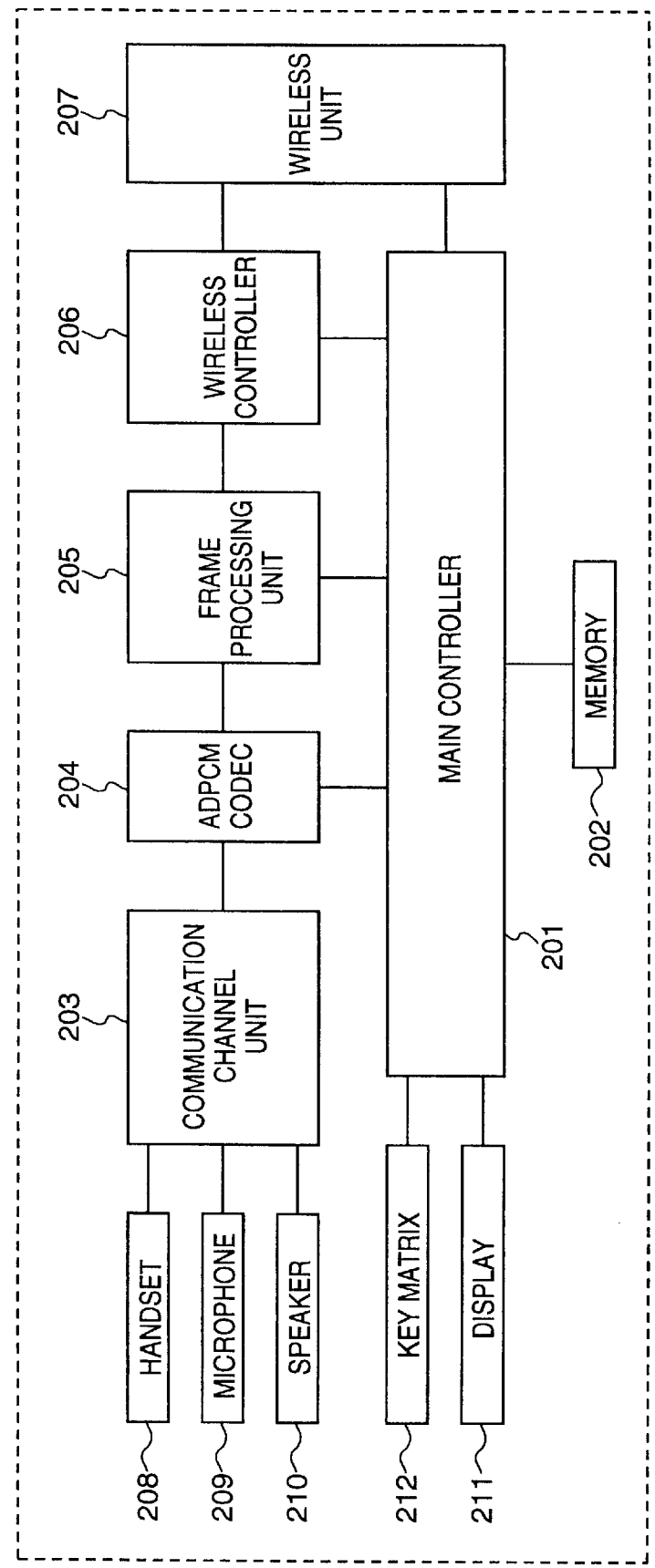
FIG. 2 is a block diagram illustrating a configuration of a radiotelephone according to that embodiment.

FIG. 2 is a block diagram illustrating a configuration of the radiotelephone 103.

A main controller 201 is for controlling the entire radiotelephone 103, and a memory 202 comprises a ROM storing a control program for the main controller 201, an EEPROM for storing a call code (e.g., system ID) of the wireless communication system and a sub-ID of the radiotelephone, a RAM for providing a work area for the control by the main controller 201.

A communication channel unit 203 interfaces between input/output blocks of a handset 208, a microphone 209, and a speaker 210 and an ADPCM (Adaptive Differential Pulse Code Modulation) codec 204.

The ADPCM codec 204 converts an analog audio signal from the communication channel unit 203 into ADPCM codes as well as converts ADPCM code information into an analog audio signal.

A frame processing unit (channel codec) 205 performs processes, such as scramble, on ADPCM code information and multiplexes it in a predetermined frame in time division. Data which is assembled into a frame, to be explained later, in the frame processing unit is transmitted to the controlling station and the designated terminal via a wireless unit 207.

A wireless controller 206 has functions of switching send/receive and frequencies of a wireless unit 207, detecting a carrier wave and level of the carrier wave, and performing bit synchronization.

The wireless unit 207 modulates digital information from the frame processing unit 205 into a form which can be transmitted wireless and passes it to an antenna, as well as demodulating information received by wireless via the antenna into digital information.

The handset 208 is for inputting and outputting audio signals for communication, and the microphone 209 is for collecting and inputting audio signals. The speaker 210 is for amplifying and outputting the audio signals, and the display 211 displays a dial number inputted from a key matrix 212 and a utilization state of a public line. The key matrix 212 comprises dialing keys for inputting telephone numbers, an external key, a holding key, and a speaker key.

Further, the radiotelephone machine 103 has a function of switching between the controlling station and a terminal by means of a switch or software control.

(2) Wireless Adapter

Figure 3:
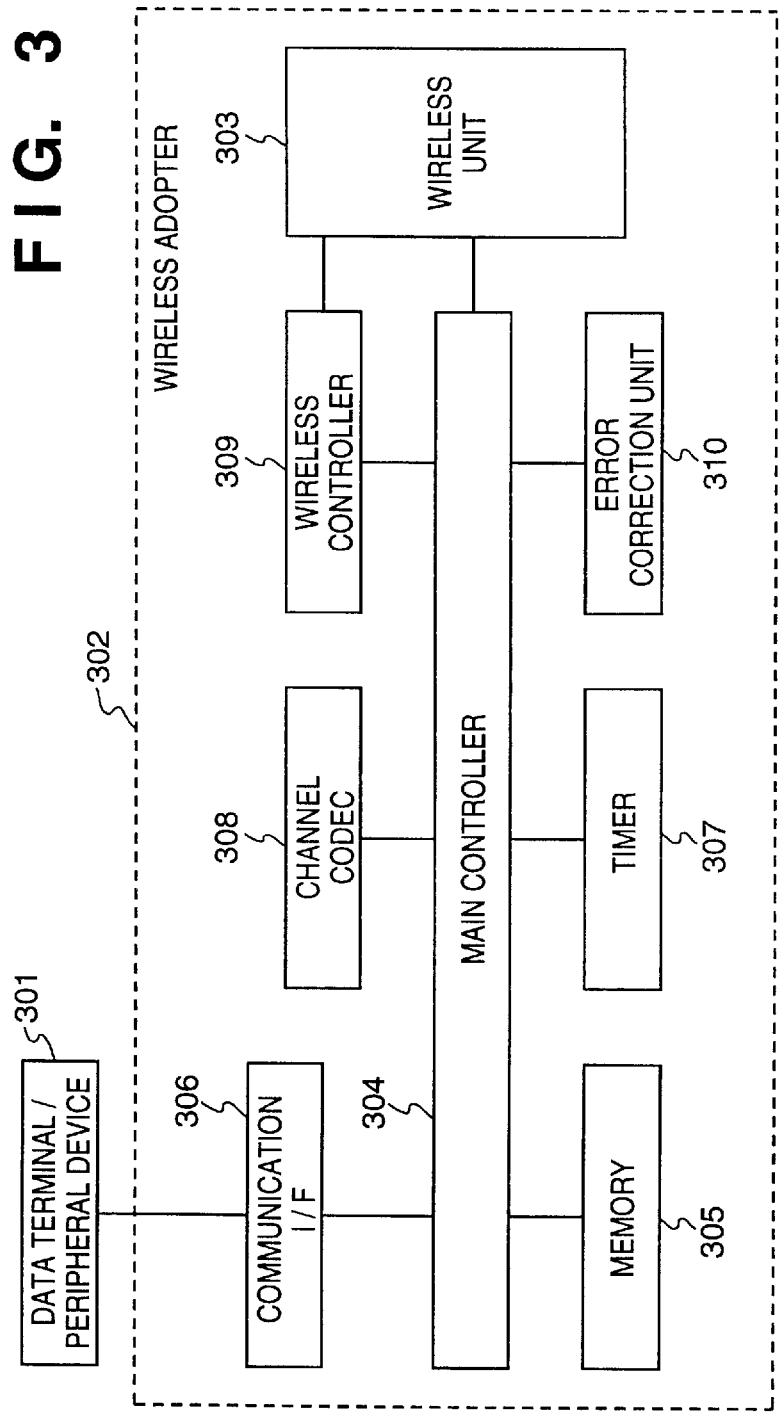
FIG. 3 is a block diagram illustrating an internal configuration of a wireless adapter to be connected to or built in a wireless data terminal device according to that embodiment.

FIG. 3 is a block diagram illustrating an internal configuration of a wireless adapter which is connected or built in each of the wireless data terminals 104 to 109.

In FIG. 3, reference numeral 301 denotes a data terminal, such as a computer, or a peripheral device, such as a printer or a facsimile machine, which is to be connected to a wireless adapter 302 via a communication cable or an internal bus.

A wireless unit 303 of the wireless adapter 302 is for transmitting and receiving radio signals to/from a wireless unit of another wireless adapter, the detailed configuration will be explained later in detail.

A main controller 304 includes a CPU which is a main control unit, a peripheral device which performs interrupt control and DMA control, an oscillator for a system clock, and so on, and controls each block of the wireless adapter.

A memory 305 has a ROM for storing a program to be used by the main controller 304 and a RAM to be used as a buffer area for various processes.

A communication interface (I/F) 306 controls so that the wireless adapter 302 can perform communication by using a communication interface which is a standard equipment of the data terminal or peripheral device 301, such as RS232C, centronics, LAN, and so on, and an internal bus of a personal computer and a workstation, such as ISA bus and a PCMCIA interface.

A timer 307 provides timing information to be used by each block in the wireless adapter 302. A channel codec 308 assembles and disassembles a communication frame which is as shown in FIG. 8, as well as performing simple error detection, such as a CRC (Cyclic Redundancy Check), and scrambling.

A wireless controller 309 controls switching of send/receive and frequencies of the wireless unit 303, has a function of carrier detection, level detection and bit synchronization.

An error correction unit 310 is to detect or correct a bit or byte error occurred in communicated data due to a various wireless communication situation. During transmission, it inserts an error correction code in the communication data so that the data has redundancy. Further, during reception, it calculates the position of an error occurred and an error pattern by performing mathematical operation, and thereby corrects the bit error occurred during data reception.

Further, the wireless adapter 302 has a function of switching between the controlling station and a terminal by means of a switch or software control.

(3) Network Controller

Figure 4:
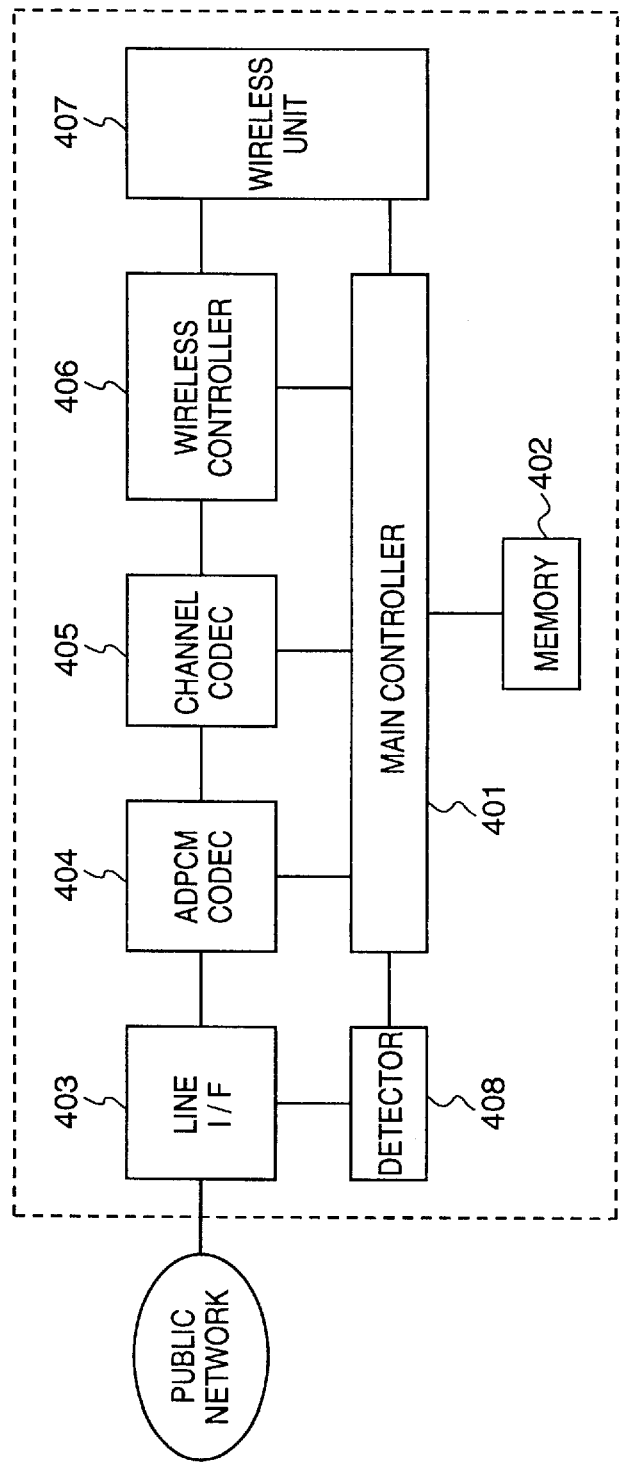
FIG. 4 is a block diagram illustrating an internal configuration of a network controlling apparatus according to that embodiment.

FIG. 4 is a block diagram illustrating an internal configuration of the network controller 101.

A main controller 401 is for controlling an overall operation of the network controller 101, and a memory 402 comprises a ROM for storing a call code (system ID) of a program and the wireless communication system, a RAM for storing a various kinds of data for control by the main controller 401 and providing a work area for various operations.

A line interface (I/F) 403 supplies electric power, performs selection command transmission, direct current loop closure, public network control, such as PCM (Pulse Code Modulation) conversion, selection command reception, call command transmission in order to connect to a public network line 102.

The line I/F 403 includes a Public Switched Telephone Network (PSTN) board for each line. The PSTN board will be explained later.

An ADPCM codec 404 converts an analog audio signal received by the line I/F 403 via the public network 102 into ADPCM codes, and transmits them to a channel codec 405, as well as converts an ADPCM-coded audio signal, from the channel codec 405 into an analog audio signal.

The channel codec 405 performs processes, such as scrambling, on the ADPCM-coded information as well as multiplexes it into a predetermined frame in time division. The data assembled into a wireless communication frame, which will be explained later, by the channel codec 405 is transmitted to the controlling station or a destination wireless terminal 110 via a wireless unit 407.

A wireless controller 406 controls switching send/receive and frequencies of the wireless unit 407, as well as having a function of carrier detection, level detection and bit synchronization.

The wireless unit 407 modulates information assembled into a frame from the channel codec 405 into a format which can be transmitted by wireless and sends it to an antenna, as well as demodulating information received from the antenna by wireless into digital information. A detector 408 detects arrival of signal, a loop, and various tones, such as a touch-tone signal, a dial tone, and an incoming call tone.

Further, the network controller 101 also has a function of switching between the controlling station and a terminal by means of a switch or software control.

(4) Wireless Unit

Figure 5:
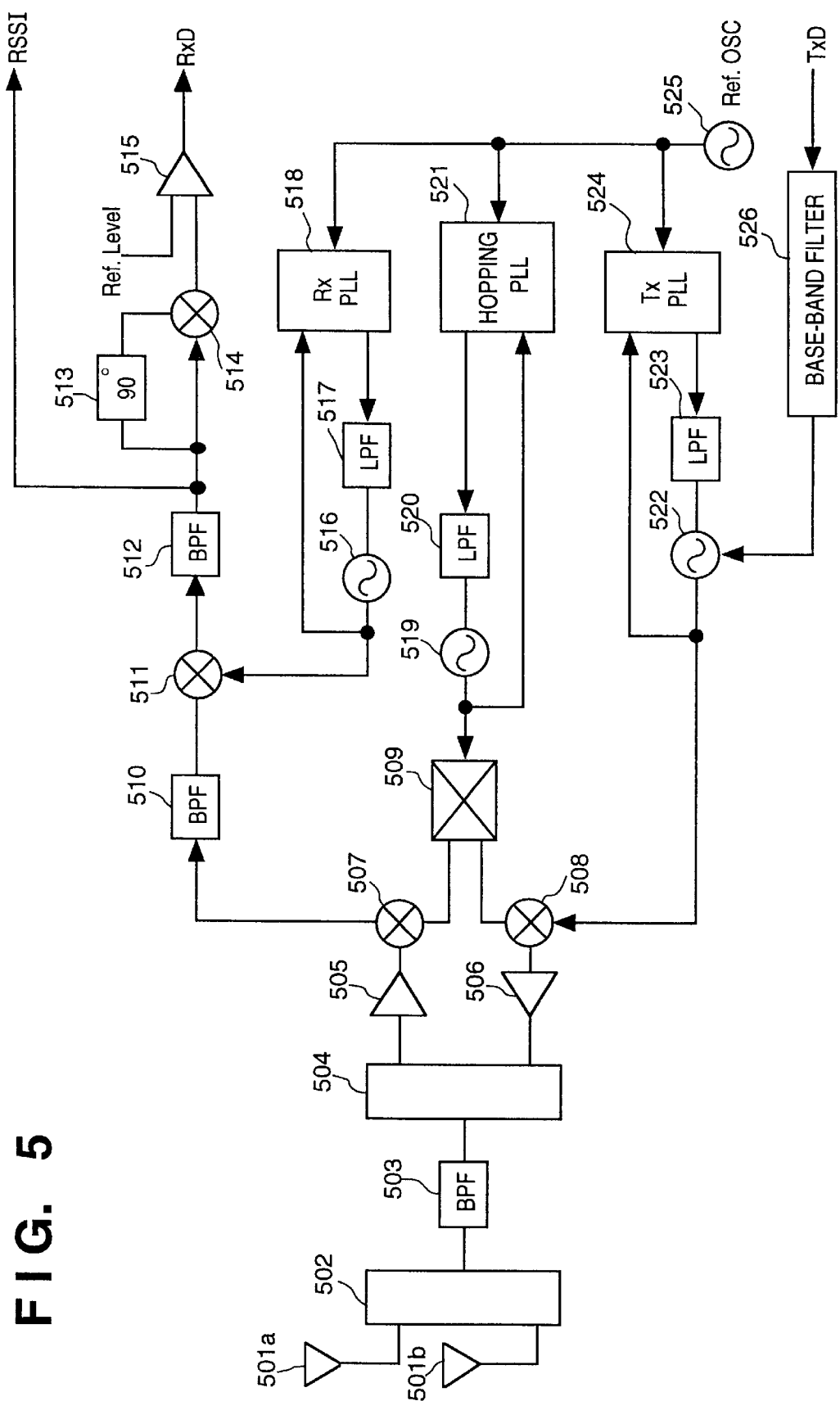
FIG. 5 is a block diagram illustrating a configuration of a wireless unit which is commonly used in the wireless terminals according to that embodiment.

FIG. 5 is a block diagram illustrating the wireless unit whose configuration is common to those used in the wireless terminals 110 of this system.

Antennas 501a and 501b are for effective transmission and reception of radio signals. A switch 502 is for switching between the antenna 501a and the antenna 501b. A band-pass filter (BPF) 503 is for removing signals in an unnecessary frequency band, and a switch 504 is for switching between transmission and reception.

An amplifier 505 is an amplifier for reception, and an amplifier 506 is an amplifier for transmission whose power can be controlled. A converter 507 is a first IF (Intermediate Frequency) down-converter, and a converter 508 is an up-converter.

A switch 509 is for switching between transmission and reception, and a BPF 510 is for removing signals in an unnecessary frequency band from signals converted by the down-converter 507. A converter 511 is a second IF down-converter. The two down-converters 507 and 511 implement double-conversion reception.

A BPF 512 is for the second IF, and a quadrature phase shifter 513 shifts the phase of signal from the BPF 512 by 90 degrees. A quadrature detector 514 is for detecting and demodulating a signal received by the BPF 512 and the quadrature phase shifter 513. Further, a comparator 515 is for waveshaping the output from the quadrature detector 514.

Further, a voltage controlled oscillator (VCO) 516, a low pass filter (LPF) 517, and a phase-locked loop (PLL) 518 (Rx PLL) which comprises a programmable counter, a pre-scaler, a phase comparator, and so on, configure a frequency synthesizer of a receiving system.

Further, a VCO 519 for carrier signal generation, a LPF 520, and a PLL 521 (Hopping PLL) which comprises a programmable counter, a pre-scaler, a phase comparator, and so on, configure a frequency synthesizer for frequency hopping.

Further, a VCO 522, having a modulation function, of a transmission system, a LPF 523, and a PLL 524 (Tx PLL)

which comprises a programmable counter, a pre-scaler, a phase comparator, and so on, configure a frequency synthesizer of the transmission system having a frequency modulation function.

A reference clock oscillator 525 provides a reference clock for the PLLs 518, 521 and 524, and a base-band filter 526 is a filter for limiting frequency band of transmission data (base-band signal).

(Explanation of Configuration and Operation of Public Switched Telephone Network (PSTN) Board)

A PSTN board is a board which configures the line I/F 403 of the network controller 101 together with a channel codec (CHC) board. It includes an interface for a single PSTN line, and controls the transmission and reception to/from the PSTN line.

Figure 6:
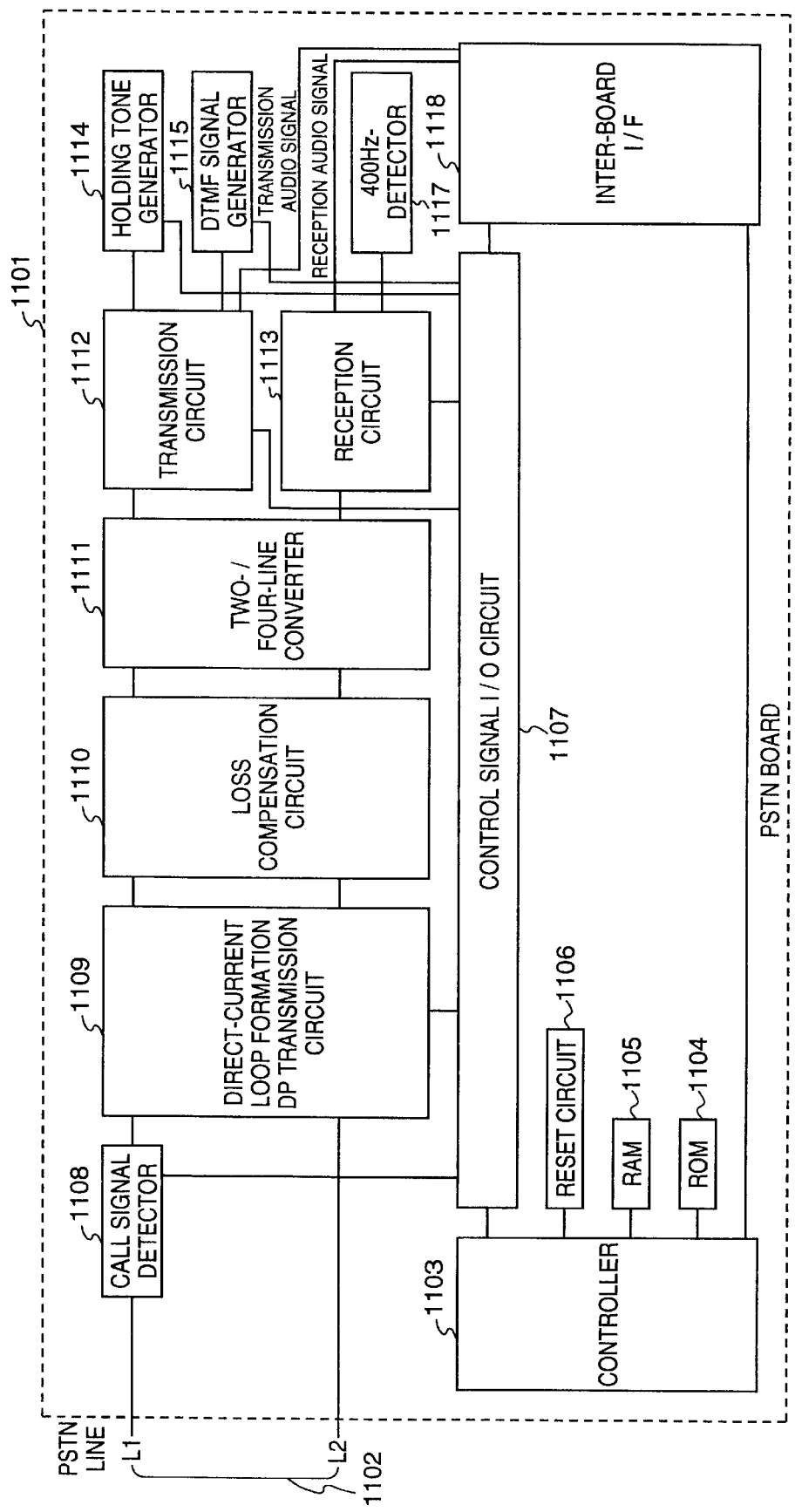
FIG. 6 is a block diagram illustrating a configuration of a Public Switched Telephone Network (PSTN) board according to that embodiment.

FIG. 6 is a block diagram illustrating a configuration of a PSTN board 1101.

In FIG. 6, a PSTN line 1102 is a single telephone line having lines L1 and L2, and a controller 1103 controls the PSTN board 1101 including the PSTN line. A ROM 1104 stores a control program used by the controller 1103, and a RAM 1105 stores various kinds of data used for control by the controller 1103 as well as provides a work area for various operations. Further, a reset circuit 1106 is connected to the controller 1103.

A control signal input/output (I/O) circuit 1107 is for inputting and outputting a control signal to/from each unit, and a call signal detector 1108, directly connected to the PSTN line 1102, detects a call signal (e.g., 16 Hz/75V) (i.e., detects an incoming call). A direct-current loop formation/DP (dial pulse) transmission circuit 1109 closes a direct-current loop of the PSTN line 1102 and transmits a dial pulse (DP).

A loss compensation circuit 1110 is for compensating a resistance of the PSTN line, and a two/four-line converter 1111 converts a two-line signal of the PSTN line into a four-line signal.

A transmission circuit 1112 selects a signal source to be outputted to the PSTN line as well as amplifies the transmission signal. A reception circuit 1113 selects a signal source to be outputted to the wireless terminal 110 which is to be a communication partner via the PSTN line as well as amplifies a received signal.

A holding tone generator 1114 outputs a holding tone to the PSTN line, and a DTMF (Dual Tone Multi-Frequency) signal generator 1115 is for generating a DTMF signal for touch-tone dialing.

A 400 Hz-detector 1117 is for detecting a dial tone and a busy tone, and an inter-board interface (I/F) 1118 sends and receives signals to/from the channel codec 405 and the ADPCM codec 404.

Further, the PSTN board 1101 has a function of switching between the controlling station and a terminal by means of a switch or software control.

(Operation of Wireless Communication Frame)

Figure 7:
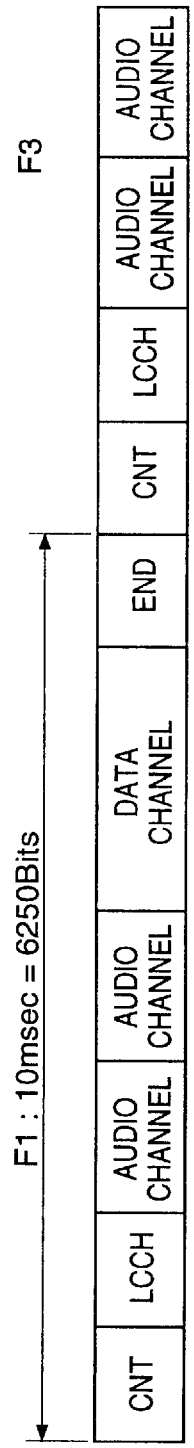
FIG. 7 is an explanatory view showing an example of a channel configuration in a frame used in the wireless communication system according to that embodiment.

FIG. 7 is an explanatory view showing an example of a channel configuration of a frame used in the wireless communication system of that embodiment.

In FIG. 7, CNT indicates a system control channel for transmitting synchronizing information, for example, and LCCH indicates a logic control channel for transmitting information on connection and disconnection of a wireless line. Audio data is exchanged in the bi-direction by using two audio channels, and data is exchanged by using data channel. Further, END shows guard time for changing frequencies for frequency hopping in the next frame. As shown in FIG. 7, the frame used in this system consists of six channels, namely, CNT channel, LCCH channel, two audio channels, data channels and END.

FIG. 8 is an explanatory view showing an internal structure of each channel.

In FIG. 8, CS indicates a carrier sense time of 12.8 $\mu$sec; PR, 56 bits of preamble for achieving bit synchronization; SYN, 1 dummy bit plus 31 bits of frame synchronization signal; ID, 63 bits of call signal plus 1 dummy bit; UW, 24 bits of unique word (for achieving byte synchronization); BF, 8 bits of base frame number information (circulate the numbers 1 to 20 sequentially); WA, a field in which a destination address of a terminal to be activated is written among terminals in sleeping mode; NF, a frequency number to be used in the next frame (e.g., one of the numbers corresponding to frequencies F1, F2, . . . , used in hopping patterns shown in FIG. 9 which will be explained later); Rev, area information for discriminating a given cell and its next cell; GT, guard time; CS0, CS1 and CS2 indicate carrier sense time; DA, a field to which a destination address is to be written; CRC in the system control channel, CRC (Cyclic Redundancy Check) information corresponding to BF to Rev; CRC in the logic control channel, CRC information corresponding to data; CRC in the audio channel, CRC information corresponding to T/R; CF, guard time for changing frequencies; and T/R, B channel information of 32 kbps.

Further, the Data field in the logic control channel is where control information is written, and the Data field in the data channel is where data to be transmitted is written. Note, the numbers in FIG. 8 indicate the numbers of bits, which indicate examples of the length of each field.

The controlling station transmits the CNT channel at the start of each frame, and stations other than the controlling station always receive the CNT channel for achieving bit synchronization and frame synchronization. The LCCH channel is used for connecting and disconnecting communication line, exchanging a request for a frequency hopping pattern with the controlling station before connecting communication line, and exchanging a request for releasing the frequency hopping pattern with the controlling station when disconnecting communication line. Note the connecting and disconnecting communication line is performed by directly exchanging information between terminals by writing a destination address of a destination terminal in the DA field in the LCCH channel.

One of the two audio channels is used for transmission, and the other is used for reception, thereby realizing audio communication. Which of the two audio channels is used for transmission or reception is determined by negotiating between communicating terminals in the LCCH channel which is exchanged when connecting a communication line. Regarding the data channel, how the data transmission is performed is determined by negotiating between communicating terminals in the LCCH channel exchange when connecting the communication line. Further, a destination address of a terminal is a number uniquely assigned to each terminal of the system, and it is possible to set a global address indicating all the terminals in the system when setting the destination address. Further, it is possible to provide an address common to all the terminals in a given group.

(Frequency Hopping)

Figure 9:
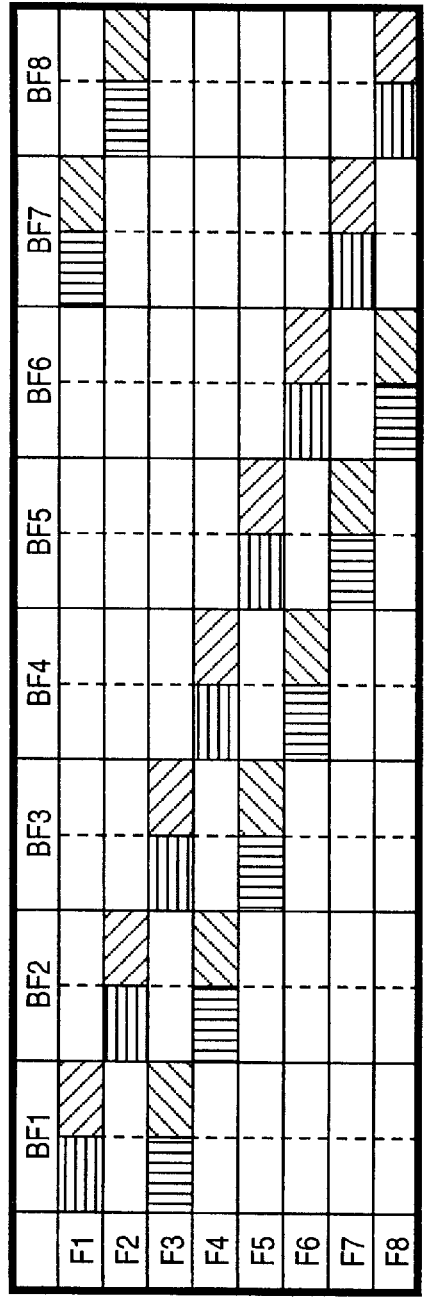
FIG. 9 is an explanatory view showing an example of frequency hopping of an audio channel and its transmission/reception state according to that embodiment.

FIG. 9 is an explanatory view showing an example of frequency hopping in this embodiment. A system having eight base frames (BF) and using eight different frequencies, F1 to F8, is described here as an example. FIG. 9 shows which frequencies the first and second frequency hopping patterns (HPs) use in each BF.

As shown in FIG. 9, frequency hopping patterns (HP) do not a frequency more than once in one BF. Further, an allocated time period of one BF corresponds to the time period of a frame shown in FIG. 7, and BF to be used changes as its allocated time period elapses, thereby hopping frequencies of each HP change after each frame in a predetermined order.

(Explanation of Configuration and Operation of Channel Codecs (CHCs) 308 and 405)

Each of the channel codecs 308 and 405 is basically configured with a channel codec which assembles data in a predetermined frame format and disassembles a frame, a wireless unit for modulation and demodulation, and an ADPCM codec which digitally encodes and decodes audio data.

Figure 12:
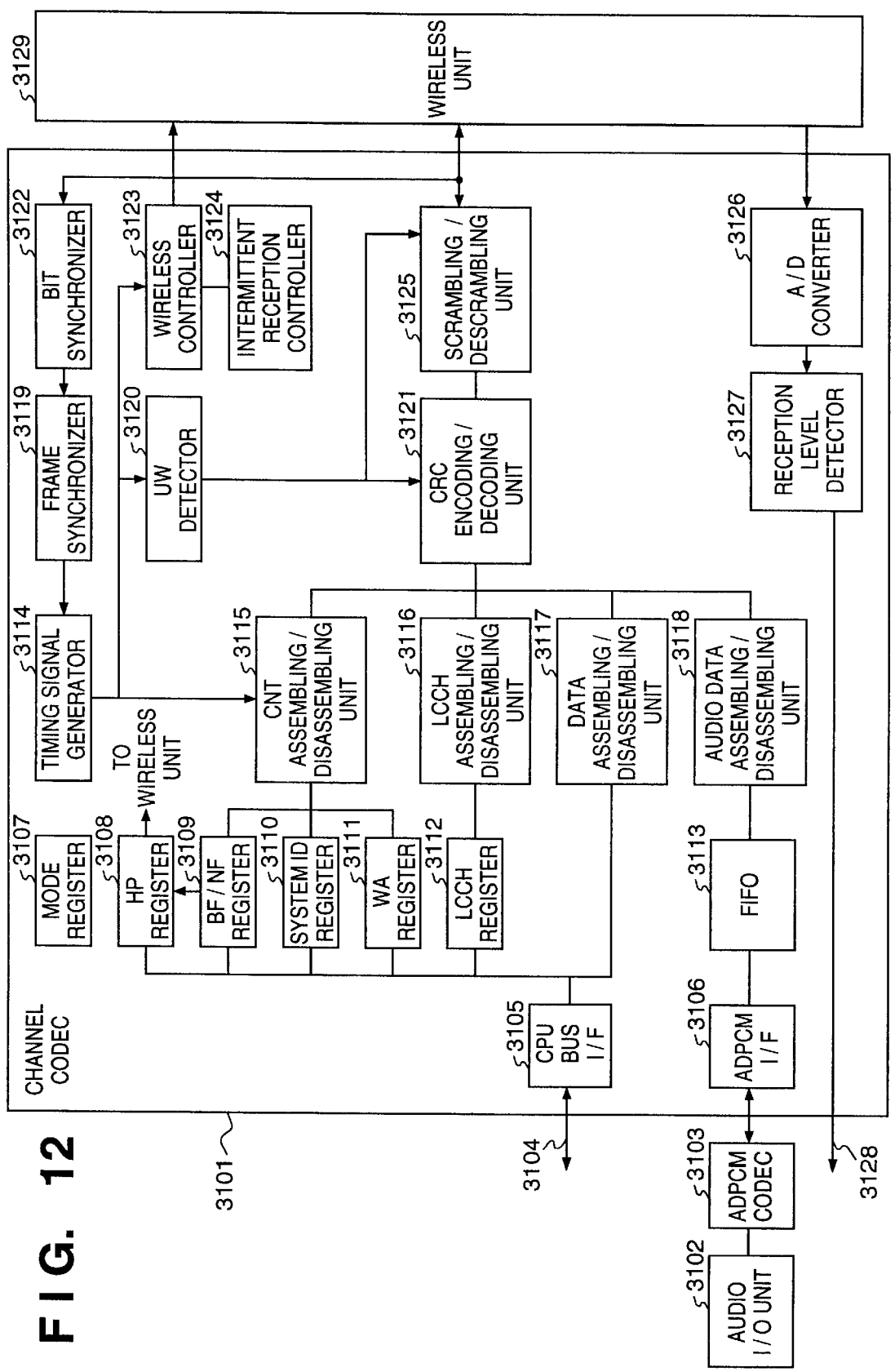
FIG. 12 is a block diagram illustrating a channel codec according to that embodiment.

FIG. 12 is a block diagram illustrating an internal configuration of a channel codec. Referring to FIG. 12, the channel codec 3101 is provided between an ADPCM codec 3103 to which an audio input/output (I/O) unit (e.g., handset, microphone, speaker) 3102 is connected and a wireless unit 3129.

The channel codec 3101 has a CPU bus interface (I/F) 3105 to which a CPU data bus 3104 is connected, an ADPCM interface (I/F) 3106 which is connected to the ADPCM codec 3103, a mode register 3107 for setting an operation mode, a frequency hopping pattern (HP) register 3108, a frame number/next frequency number (BF/NF) register 3109, a system ID register 3110, an intermittent activation terminal address (WA) register 3111, an LCCH register 3112, and a FIFO buffer 3113.

Further, the channel codec 3101 further includes a timing signal generator 3114, a CNT assembling/disassembling unit 3115, an LCCH (logic control channel) assembling/disassembling unit 3116, a data assembling/disassembling unit 3117, an audio data assembling/disassembling unit 3118, a frame synchronizer 3119, a unique word (UW) detector 3120, a CRC encoding/decoding unit 3121, a bit synchronizer 3122, a wireless controller 3123, an intermittent reception controller 3124, a scramble/descramble unit 3125, an A/D converter 3126 for converting an analog signal received from the wireless unit 3129 into a digital signal, and a reception level detector 3127 which detects a reception level on the basis of an input from the A/D converter 3126 and outputs an interruption signal 3128.

Next, an operation of the channel codec will be described with reference to FIG. 12.

A reference for operational timing of the channel codec is generated by the timing signal generator 3114 of the channel codec 3101 of the controlling station. The controlling station sends a frame in accordance with the timing signal, and terminal which received the frame keeps frame synchronization in accordance with the frame synchronization word.

Data to be sent from the controlling station in the CNT channel is stored in a register in the channel codec 3101. The channel codec 3101 has the HP register 3108, the system ID register 3110, and the WA register 3111 inside, and in the controlling station, a CPU writes necessary values to these registers. Further, values stored in the BF/NF register 3109 are updated in synchronization with the operational timing. Frequency numbers to be written in the BF/NF register 3109 show a frequency hopping pattern for the CNT channel. The channel codec 3101 reads data in these registers at the time of transmitting data in the CNT channel, the CNT assembling/disassembling unit 3115 assembles the data read from the registers, and the data is transmitted to the wireless unit 3129.

When terminal receives the data in the CNT channel from the wireless unit 3129, the CNT assembling/disassembling unit 3115 disassembles and processes it by using the received data of each frame. Only in the case where the received system ID matches a value written in the system ID register 3110 of the terminal, terminal controls so as to receive the subsequent data. If a value in the received WA field matches a value stored in the WA register 3111 of the terminal during reception of data intermittently, it generates an interruption signal for requesting activation. Further, it overwrites the table in the HP register 3108 by using the received BF and NF information data.

Note, the frequency numbers written in a NF field is for a frequency hopping pattern of the CNT channel, and frequency hopping patterns used in the audio channel and data channel are generated by shifting the content in the HP register which is generated based on the frequency numbers written in the NF field.

The LCCH assembling/disassembling unit 3116 assembles data, stored by the CPU of an originating terminal in the LCCH register 3112 in the channel codec 3101, into the LCCH channel, and the assembled data is outputted to the wireless unit at a predetermined timing. Further, received LCCH data is disassembled in the LCCH assembling/disassembling unit 3116, temporarily stored in the LCCH register 3112 in the channel codec. Then an interruption request is generated to a CPU and the CPU reads the data.

Sound inputted from the audio I/O unit 3102 is encoded into digital signals by the ADPCM codec 3103, thereafter, inputted to the channel codec 3101 via the ADPCM I/F 3106. In the channel codec 3101 the input data is assembled by the audio assembling/disassembling unit 3118 into the audio channel, then transmitted to the wireless unit 3129 at a predetermined timing.

On the contrary, audio data received via the wireless unit 3129 is disassembled by the audio assembling/disassembling unit 3118, outputted to the ADPCM codec 3103 at a predetermined timing via the ADPCM I/F 3106, then outputted to the audio I/O unit 3102.

Data is transmitted only when a CPU of an originating terminal requests data transmission by using the data channel. When data transmission is requested, the CPU bus I/F 3105 of the channel codec 3101 outputs a DMA (Direct Memory Access) request. When a DMA controller (not shown) responds to the DMA request and when data which received by CPU bus 3104 is written in a memory (not shown), the data is converted to data in a serial order by the data assembling/disassembling unit 3117 and transmitted to the wireless unit 3129 at a predetermined timing.

Whereas, in a case of receiving data, data is converted to parallel form by the data assembling/disassembling unit 3117, and the CPU bus I/F 3105 outputs a DMA request, then the DMA controller transfers the received data to a memory. When finishing transferring data for one frame, the DMA controller generates an interruption signal to a CPU.

In the data transmission, the CRC encoding/decoding unit 3121 generates CRC codes when necessary, and the generated code is written in the CRC field and transmitted. A terminal in the receiving side checks the CRC field, thereby it is possible to detects an occurrence of an error. Further, all the transmitted data except the frame synchronization word and a unique word is scrambled by the scrambling/descrambling unit 3125. This is for decreasing unbalance of data to be transmitted to the wireless unit 3129 and making it easier to extract a synchronizing clock.

Whereas, when receiving data, when a unique word is detected, the scrambling/descrambling unit 3125 descrambles at the time of the detection of the unique word, cyclic redundancy check is performed, and data is inputted to a disassembling unit for each field simultaneously.

Audio data and other data accommodating a predetermined frame is transmitted by wireless as described above.

(Operation of Controlling Station)

Operation of the wireless communication system of this embodiment is on the assumption that the controlling station administrates hopping frequencies used in the system and that communication channels which are determined by frequency hopping patterns and time slots are assigned to terminals by the controlling station.

The controlling station has functions of changing frequency hopping patterns of the system, administrating intermittent reception states of terminals, and registering a terminal to the system, in addition to a function of administrating each communication channel. Below, administration, basic operation for communication between terminals, of communication channels by the controlling station and operation of the controlling station when a frequency hopping pattern is changed is explained. The administration of communication channels by the controlling station is to assign a frequency hopping pattern which is currently not used (called "free hopping pattern", hereinafter) to each data field (audio channel or data channel) of communication requested by a terminal, and releasing the frequency hopping pattern.

The administration of communication channels will be described first. Note, in the following explanation, communication in the data channel is described, however, the same operation is performed for the audio channel. Further, it is assumed that the CNT channel and the LCCH channel use the first HP shown in FIG. 10.

Figure 13:
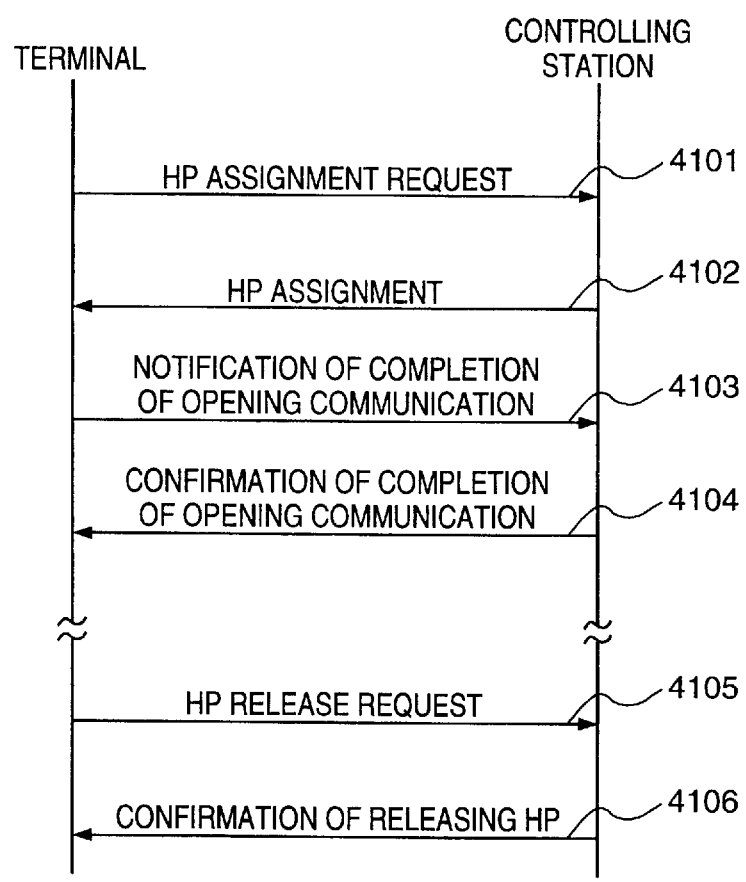
FIG. 13 is an explanatory view showing a sequence of assignment of a frequency hopping pattern according to that embodiment.

FIG. 13 is an explanatory view showing a sequence for assigning a frequency hopping pattern. FIG. 13 shows an operational sequence when a terminal request a frequency hopping pattern to the controlling station for communicating with another specific terminal until communication is finished and the frequency hopping pattern is released.

Figure 10:
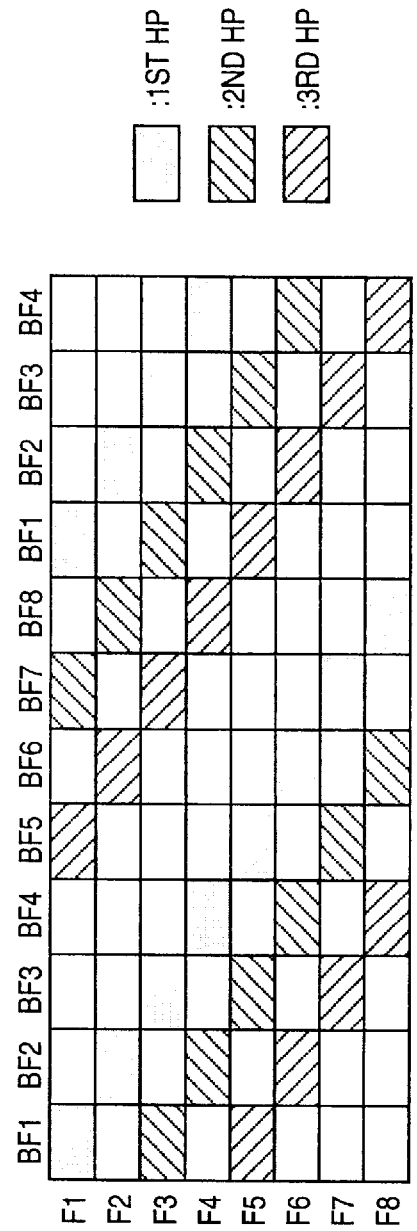
FIG. 10 is an explanatory view showing an example of frequency hopping according to that embodiment.

In FIG. 13, terminal sends a frequency hopping pattern assigning request 4101 to the controlling station by using the LCCH channel in order to open communication with the destination terminal. The request 4101 includes parameters, such as an ID of the destination terminal and a value showing kind of data to be transmitted. If there is a free hopping pattern for the requested data field, the controlling station sends a hopping pattern assignment 4102 to the terminal. In this example, since the second HP, shown in FIG. 10, is not used, the controlling station notifies the terminal of the second HP assignment.

When the frequency hopping pattern is assigned to the terminal, terminal requests to open communication to the destination station by directly transmitting the frequency hopping pattern information. Then, after the acknowledge for opening communication is received by the destination station, the originating terminal sends a notification 4103 of completion of opening communication to the controlling station.

Upon receiving the notification 4103 from the terminal, the controlling station confirms the utilization status of the assigned frequency hopping pattern, and records the use of the frequency hopping pattern in a RAM. Thereafter, the controlling station sends a confirmation 4104 of completion of opening communication to the terminal. In this example, the controlling station administrates the second HP as being used. Further, after terminal receives the confirmation 4104, it communicates with the destination station by using the second HP. At this time, if another terminal requests frequency hopping pattern assignment for communication from the controlling station, the controlling station assigns a HP other than the second HP, e.g., the third HP, to the other terminal.

After the communication is finished, the terminal closes the communication with the destination station, then sends a hopping pattern release request 4105 to the controlling station. In this case, terminal sends a request for releasing the second HP. The controlling station changes the utilization status of the assigned frequency hopping pattern stored in the RAM, then sends a confirmation 4106 of releasing the frequency hopping pattern to the terminal. The terminal terminates the communication when the confirmation 4106 is received.

Figure 14:
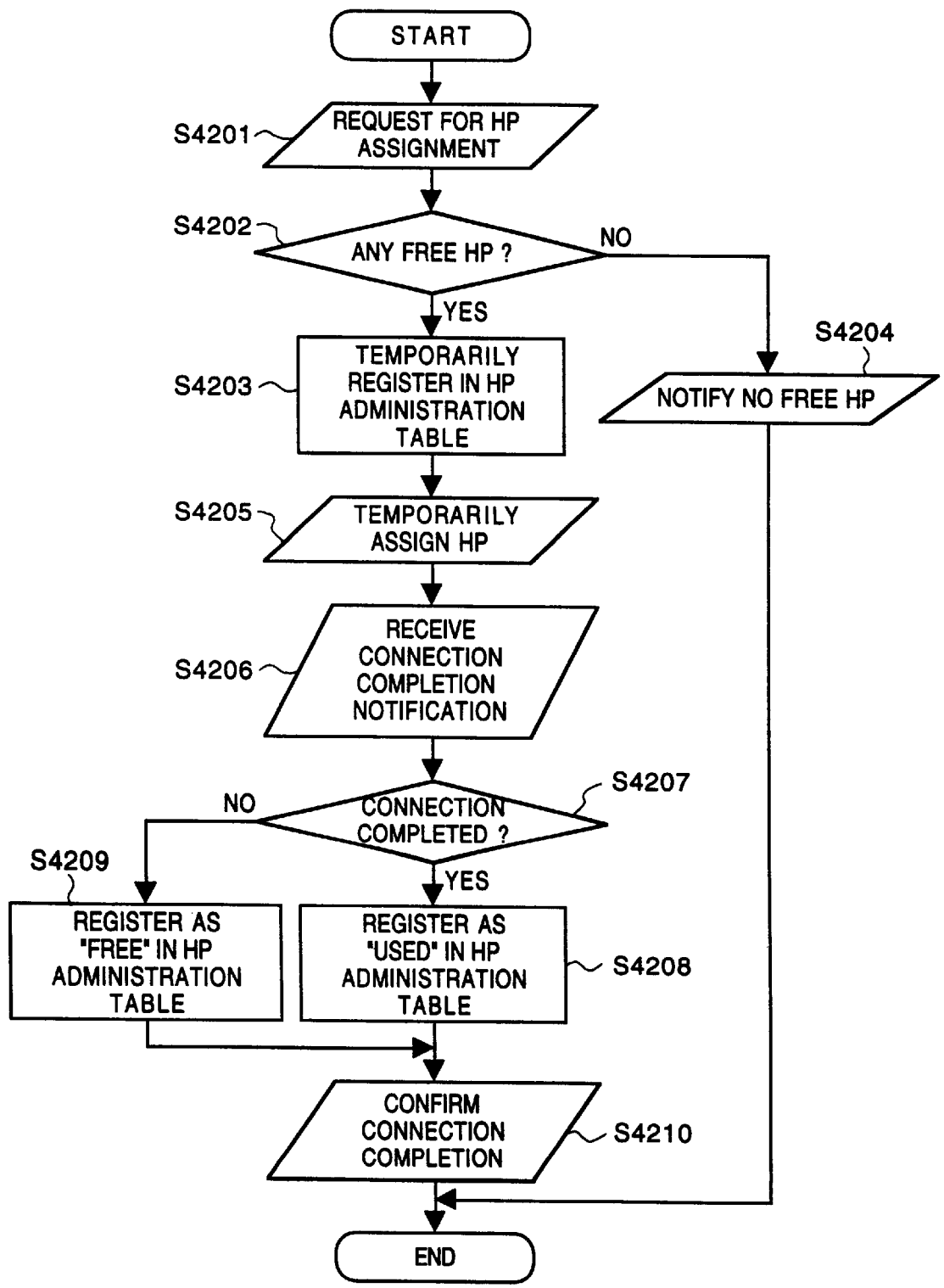
FIG. 14 is a flowchart showing a processing sequence of signing a frequency hopping pattern according to that embodiment.

FIG. 14 is a flowchart showing a sequence of hopping pattern assignment in the controlling station. In FIG. 14, processes performed by the controlling station, when a terminal requests a frequency hopping pattern until communication with the destination terminal is actually started are shown.

Referring to FIG. 14, when the controlling station receives a request for hopping pattern assignment from a terminal (step S4201) by using the first HP shown in FIG. 10, it checks whether there is a free hopping pattern for the requested data field hopping or not by checking a hopping pattern administration table set in the RAM (step S4202). Then, if there is no free hopping pattern, the controlling station notifies terminal that no frequency hopping pattern is currently available (step S4204) by using the first HP. Whereas, if there is a free hopping pattern, it temporarily registers the frequency hopping pattern on the hopping pattern administration table in the RAM (step S4203), and then it temporarily assigns the frequency hopping pattern to the terminal by using the first HP (step S4205). In this example, the assigned frequency hopping pattern is the second HP shown in FIG. 10.

When the controlling station receives a connection completion notification by using the first HP from the terminal (step S4206), it knows whether or not the terminal successfully connected to a destination station by using the temporality assigned frequency hopping pattern (second HP) (step S4207). If the terminals are not successfully connected, the temporally assigned frequency hopping pattern (second HP) is registered as "free" in the HP administration table (step S4209), whereas, if the terminals are successfully connected, the temporarily assigned frequency hopping pattern (second HP) is registered as "used" in the HP table (step S4208). After the controlling station finishes registering the utilization state of the frequency hopping pattern in the HP administration table, it sends a connection completion confirmation (step S4210) by using the first HP to the terminal, and thereby, the frequency hopping pattern assignment requested by the terminal is completed.

Figure 15:
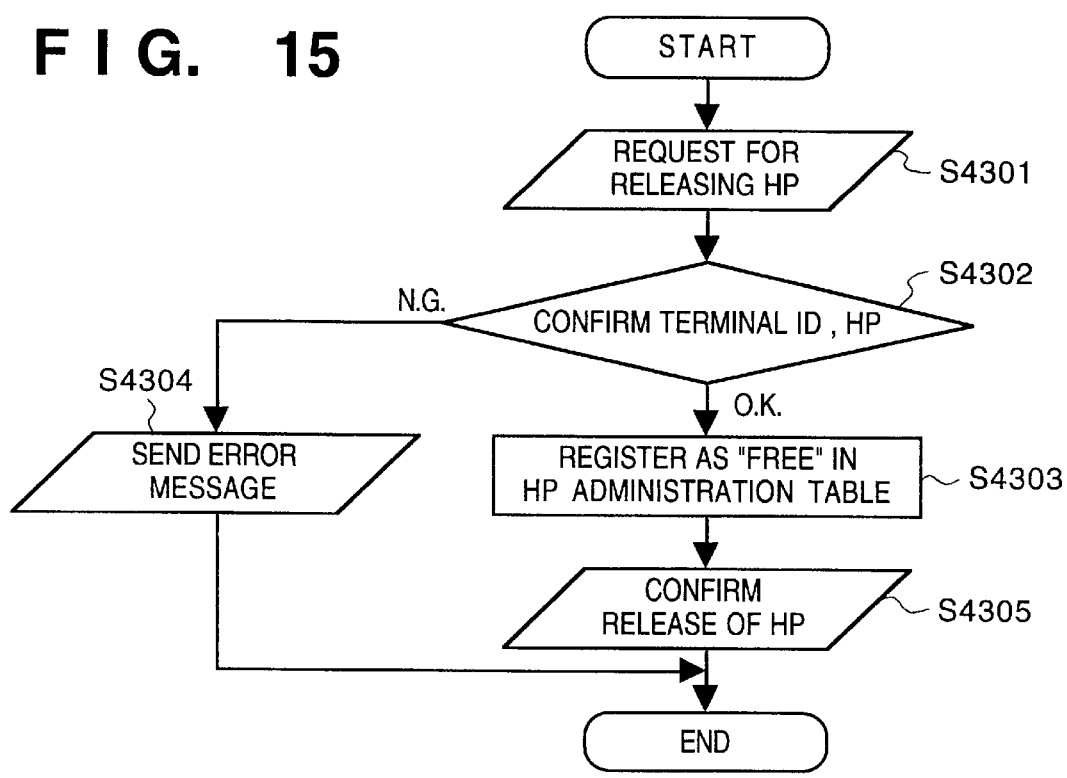
FIG. 15 is a flowchart showing a processing sequence of releasing a frequency hopping pattern according to that embodiment.

FIG. 15 is a flowchart showing an operation for releasing a frequency hopping pattern performed in the controlling station. FIG. 15 shows processes performed by the controlling station when terminal finishes communication until the controlling station releases an assigned frequency hopping pattern.

Referring to FIG. 15, when the controlling station receives a request for releasing the frequency hopping pattern from terminal by using the first HP (step S4301), it checks terminal ID and the frequency hopping pattern (second HP) which is requested to be released, that are included in parameters of the request (step S4302).

Thereafter, if the frequency hopping pattern (second HP) which is requested to be released is not the one which has been assigned in a normal sequence, it notifies terminal of an error message (step S4304) by using the first HP, and does not release the requested frequency hopping pattern (second HP). Further, if the controlling station confirms that the frequency hopping pattern (second HP) which is requested to be released is the one which has been assigned normally, then registers the second HP as "free" in the HP administration table (step S4303), and transmits a confirmation of releasing the frequency hopping pattern to terminal by using the first HP.

In the system of the present invention as described above, the controlling station has a specific HP administration table, and assignment of communication channel used in communication between terminals is performed by the controlling station by assigning a frequency hopping pattern. Therefore, the controlling station administrates the entire communication in the system. Further, both of control information from the controlling station to a terminal and control information from a terminal to the controlling station are exchanged by using the same frequency hopping pattern.

Next, an operation of changing frequency hopping patterns by the controlling station will be explained.

This function is for a case where a frequency out of frequencies used in frequency hopping patterns becomes useless because of interference, for example, in narrow frequency band, the useless frequency is replaced by a not-used frequency to change frequency hopping patterns, thereby avoiding interference. In changing frequency hopping patterns, there are two cases: a terminal requests change in frequency hopping patterns; and the controlling station requests change in frequency hopping patterns. In response to the request to change frequency hopping patterns, the controlling station changes the table of hopping frequencies, and notifies the change of frequency hopping patterns to each terminal in the system by using the NF (Next Frequency) field in the system control channel which is transmitted in each frame.

Figure 16:
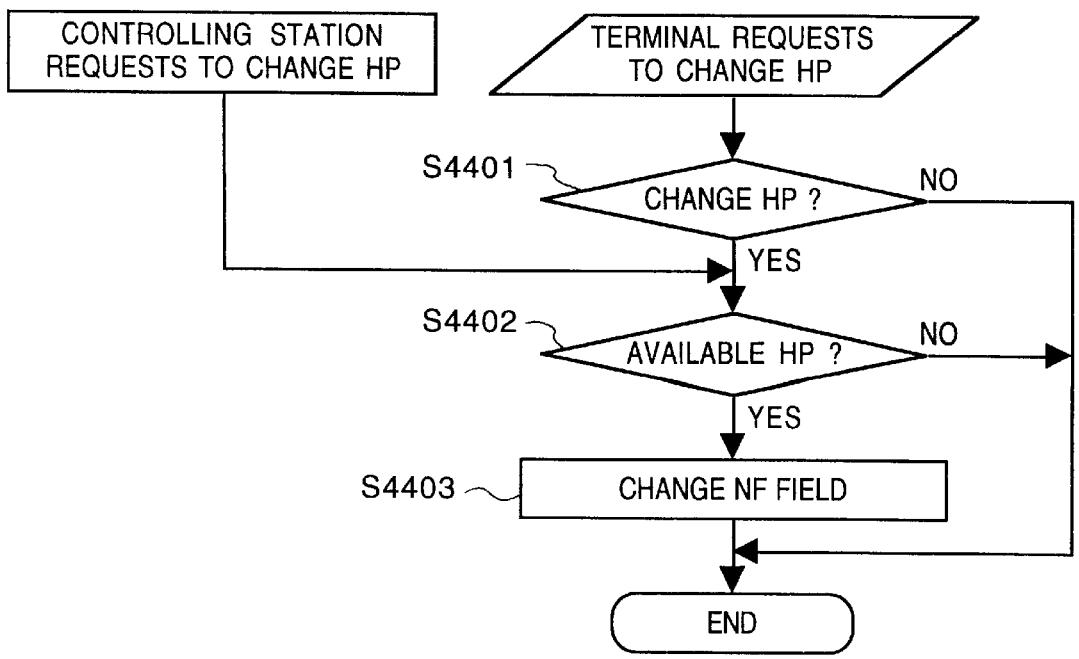
FIG. 16 is a flowchart showing a processing sequence of changing frequency hopping patterns according to that embodiment.
Figure 17:
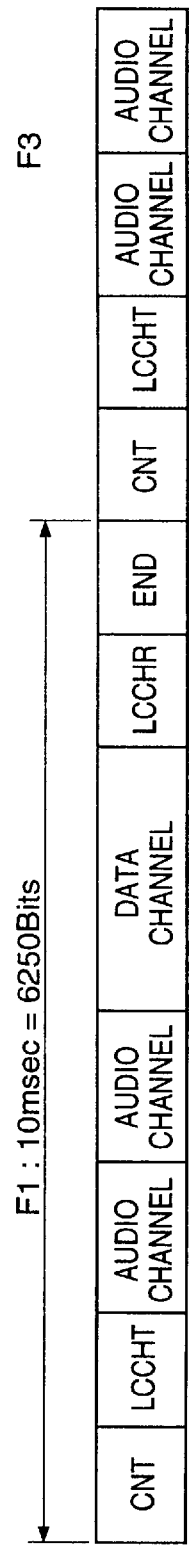
FIG. 17 is an explanatory view showing a channel configuration of a frame used by a conventional wireless communication system.

FIG. 16 is a flowchart showing an operational sequence for changing frequency hopping patterns in the controlling station.

Referring to FIG. 16, when the controlling station receives a request for changing frequency hopping patterns from terminal by using the first HP, it checks if it is necessary to change a frequency hopping pattern (step S4401). Then, if the controlling station determines it is unnecessary to change the frequency hopping pattern, it does not change the frequency hopping pattern. Whereas, if it is determined that it is necessary to change the frequency hopping pattern, it determines whether there is an available frequency hopping pattern to replace the current one (step S4402). If there is no available frequency hopping pattern, the controlling station does not change the frequency hopping pattern. The case that the controlling station does not change the frequency hopping pattern is a case that is able to use a frequency, which does not influence communicating, in frequencies capable of using is in the frequency hopping pattern. Whereas, if there is an available frequency hopping pattern, then the controlling station changes the table of hopping frequencies stored in the RAM of the wireless controller, and writes the new frequency hopping pattern in the NF field of the system control channel, thereby notifies each terminal to change frequency hopping patterns by using the first HP.

Further, in a case where the controlling station initiates a change in frequency hopping patterns, it checks whether or not there is any available frequency hopping pattern (step S4402). Then, if there is no available frequency hopping pattern, the controlling station does not change the frequency hopping pattern. Whereas, if there is an available frequency hopping pattern, then the controlling station changes the table of hopping frequencies, changes the NF field of the system control channel, then notifies that the hopping frequency is changed to each terminal (step S4403) by using the first HP.

In the system of that embodiment as described above, the controlling station administrates the change in a frequency hopping pattern in accordance with a request from a terminal or a request by itself.

(Utilization of LCCH Channel)

Next, how to perform frequency hopping in the system will be described.

Let a frequency hopping pattern in which the controlling station sends system control (CNT) channel be the first HP shown in FIG. 10.

When the next base frame time is BF1, all the terminals in the system, other than the controlling station, sets their wireless units to a frequency F1 which is used in the first HP in BF1 in order to receive the system control (CNT) channel at the top of a frame sent from the controlling station. All the terminals, other than the controlling station, achieve frame synchronization in accordance with the CNT channel received in this stage. Similarly, when the next base frame time is BF2, a frequency F2 which is used in the first HP in BF2 is set in the wireless unit in order to receive the CNT channel at the top of the frame sent from the controlling station, then all the terminals achieve frame synchronization. Operation as described above is repeated.

The logic control (LCCH) channel for directly exchanging a request for opening communication between terminals is exchanged in the same frequency hopping pattern as the one used in the CNT channel. A terminal having control data, such as data for opening communication and closing communication, which is to be transmitted in the LCCH channel designates an ID of the destination terminal in the DA field in the LCCH channel during the time for the LCCH channel, thereby directly transmitting control data to the destination terminal in the LCCH channel. Further, a terminal which does not have control data to be transmitted in the LCCH channel always receives control data transmitted from another terminal in the LCCH channel. Then, after receiving the control data, terminal checks the DA field of the LCCH channel. If terminal determined that the control data is not for itself, then the terminal abandons the received data, whereas if the control data is for the terminal, then it passes the control data to its main control unit.

Figure 11:
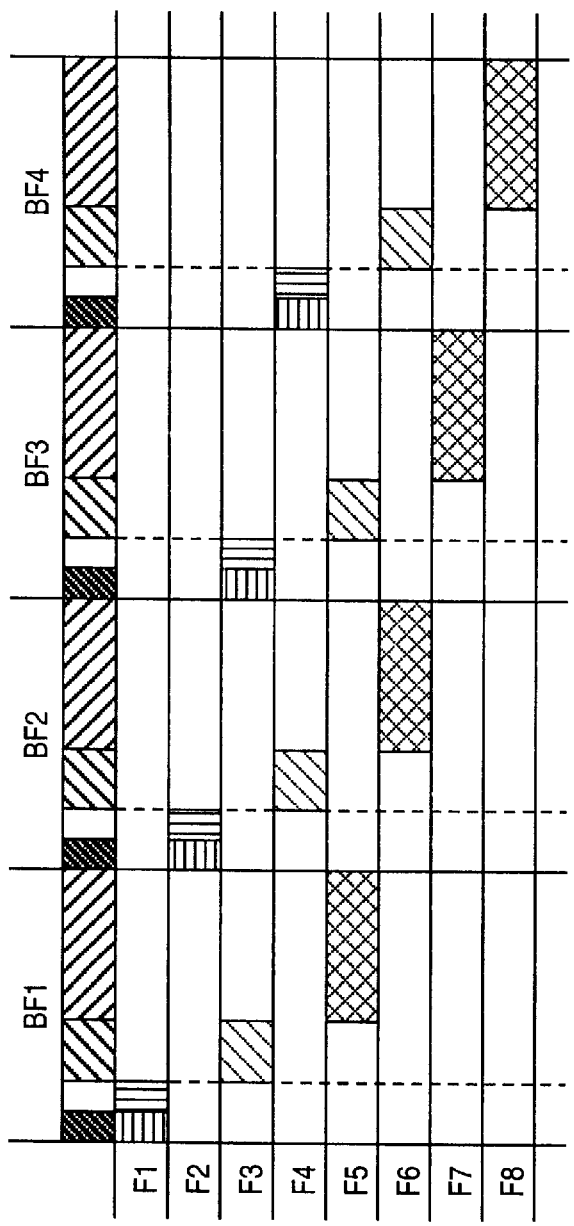
FIG. 11 is an explanatory view showing a frequency utilization state at each channel according to that embodiment.

A wireless communication terminal which performs audio or data communication performs communication at frequencies corresponding to a predetermined frequency hopping pattern assigned by the controlling station in the audio and data channels. At this time, the same frequency hopping pattern may be assigned for both the CNT channel and the LCCH channel depending upon the state of assignment by the controlling station. Note, the frequency hopping patterns referred below correspond to those shown in FIG. 10. In an example shown in FIG. 11, the first HP is assigned for the CNT channel and the LCCH channel, while the second HP is assigned for audio communication between terminals A and B, and the third HP is assigned to data communication between the terminals A and B. In other words, frequencies are changed three times in one frame.

Next, a case where terminals A and B perform audio and data communication by using the first HP which is shown in FIG. 10 and terminals C and D perform audio and data communication in the second HP will be explained. In this case, the terminals A and C transmits audio data in the first audio channel out of two audio channels, as shown in FIG. 9, and the terminals B and D transmits audio data in the second audio channel.

Figure 18:
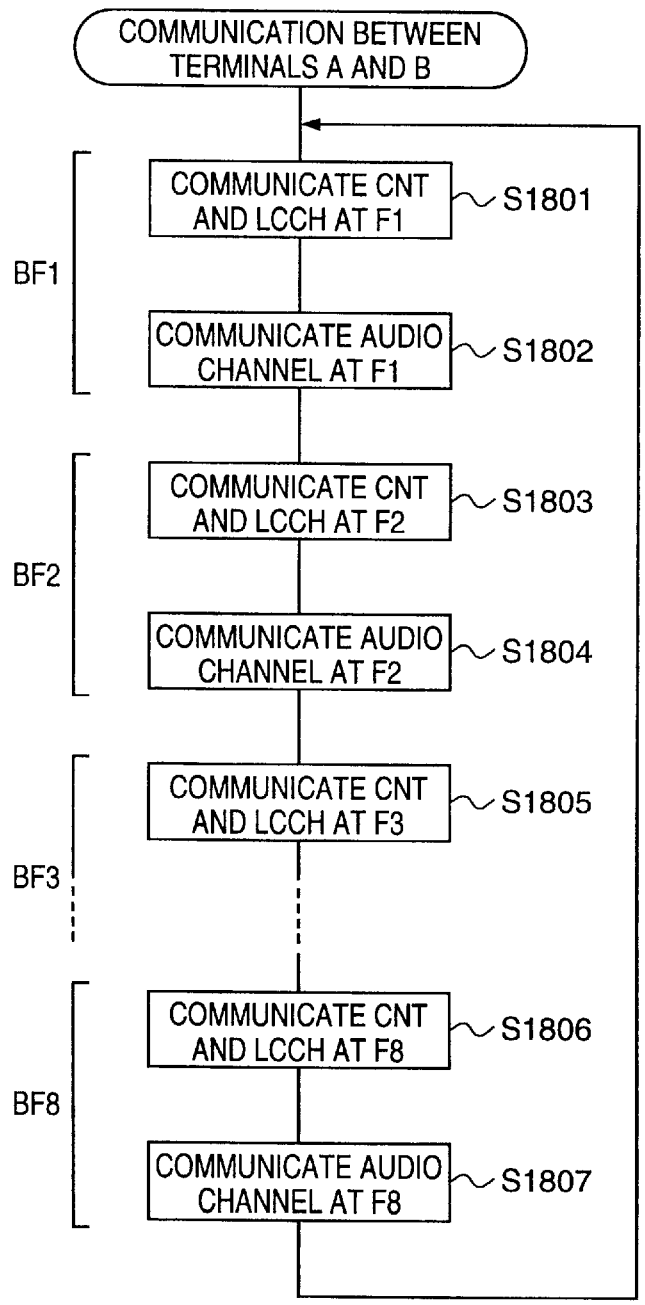
FIG. 18 is a flowchart showing an operation of a wireless communication apparatus according to that embodiment.
Figure 19:
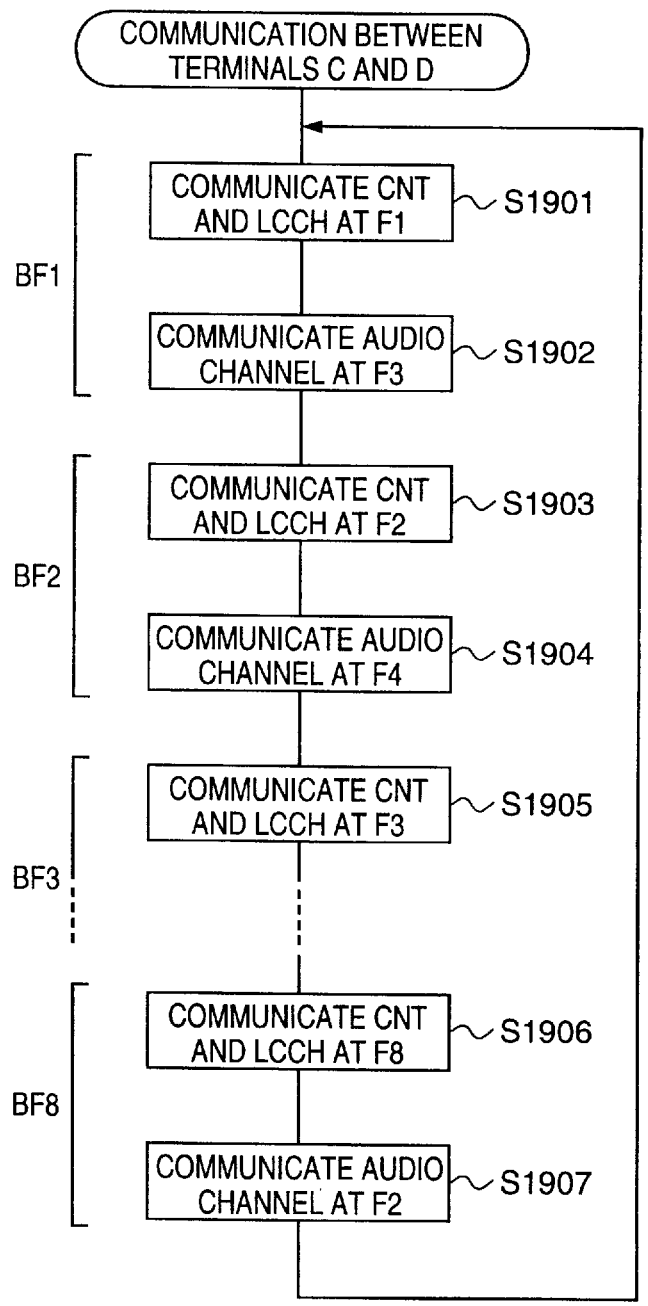
FIG. 19 is a flowchart showing an operation of the wireless communication apparatus according to that embodiment.

FIG. 18 shows a flowchart when the terminals A and B communicate, and FIG. 19 is a flowchart when the terminals C and D communicate.

Note, the CNT channel and the LCCH channel used in communication between the terminals A and B and between the terminals C and D are performed by using the first HP which is also used in the audio and data communication between the terminals A and B.

When the LCCH channel ends, the terminals set their frequencies to their wireless units to the current base frame in accordance with the frequency hopping patterns assigned in the CNT channels. Further, the terminals exchange communication control information, to determine which stations transmit audio data in the first audio channels, with respective destination stations by exchanging the LCCH channel in advance. The transmission and reception via the wireless units is controlled on the basis of the communication control information. In the case shown in FIG. 9, the terminals A and C transmits audio data in the first audio channel.

Referring to FIGS. 18 and 19, the terminals A, B, C and D communicate control information in the CNT channel and the LCCH channel at a frequency F1 which is used in the first HP in BF1 (steps S1801 and S1901). Then, when finishing transmission and reception of the LCCH channel, the terminals A and C change frequencies in accordance with frequency hopping patterns assigned for each audio communication. As for a result of changing frequencies, since the first HP is assigned for audio communication between the terminals A and B, the frequency is not changed in the terminals A and B after the exchange of the CNT channel and the LCCH channel (i.e., perform audio communication in F1) (step S1802). In contrast, the terminals C and D change the frequency to be used from the frequency F1 to the frequency F3 (step S1902). At this time, the terminals A and C set their wireless units to transmission, and terminal B and D set their wireless units to reception, thereby transmitting audio data in the first audio channels.

Thereafter, after the use of the first audio channels, the terminals A and C set their wireless units to reception, and the terminals B and D set their wireless units to transmission, then audio data is transmitted in the second audio channels. In a case of performing data communication, after the use of the second audio channels, each terminal sets a frequency obtained on the basis of the frequency hopping pattern assigned for data communication and a current base frame number to the wireless unit in order to prepare for the subsequent data communication. Since data communication is not performed in this embodiment, explanation of data communication is omitted.

After the use of the data channels, the terminals A, B, C and D set a frequency F2, which is used in the first HP in the BF2, to the wireless units in order to receive the CNT channel in the subsequent BF2 (steps S1803 and S1903).

Thereafter, when the communication in the LCCH channel ends, the terminals A and B perform audio communication in the audio channels at the frequency F2, which is used in the first HP in the BF2, assigned for audio communication (step S1804).

The terminals C and D set their wireless units to a frequency F4 which is used in the second HP in the BF2, and the wireless units communicates the audio channels at the set frequency F4 (step S1904).

Similarly, the terminals A, B, C and D change frequencies for communication in accordance with the first HP when transmitting and receiving control information in the CNT channel and the LCCH channel.

Regarding the terminals A and B, they change frequencies for communication also in accordance with the first HP since the first HP is assigned for audio communication between the terminals A and B. Further, when the terminals C and D perform audio communication, they change frequencies in accordance with the second HP assigned for audio communication between the terminals C and D.

According to the present invention as described above, a common frequency hopping pattern is used for the system control channel and the logic control in the system. Further, different frequency hopping pattern is assigned for each communication between terminals. Furthermore, communication control information in the logic control channel is directly exchanged between terminals, independent of a controlling station, and the controlling station only administrates frequency hopping patterns assigned to communication channels. Accordingly, it is possible to reduce the load on the controlling station. As a result, it is possible to use a wireless communication apparatus either as a controlling station or as a terminal by switching its function, thereby lowering the price of the controlling station.

The present invention is not limited to the above embodiments and various changes and modifications can be made within the spirit and scope of the present invention. Therefore to appraise the public of the scope of the present invention, the following claims are made.

What is claimed is:

1. A wireless communication system capable of including a plurality of wireless communication apparatuses which communicate communication frames including control information and communication information by using frequency hopping, said system comprising:

control communicating means for communicating control information in accordance with a specified first hopping pattern of plural frequency hopping patterns, which is used in said plurality of wireless communication apparatuses;

synchronization means for synchronizing the communication frames on the basis of the control information communicated by said control communicating means;

information communicating means for communicating communication information in accordance with an arbitrary second hopping pattern of the plural frequency hopping patterns, using the communication frames synchronized by said synchronization means; and control means for controlling the communication of the control information and communication information while switching over between the first hopping pattern and the second hopping pattern by said control communicating means and said information communicating means.

2. The wireless communication system according to claim 1, wherein the second hopping pattern is determined each time when performing communication.

3. The wireless communication system according to claim 1 further comprising a controlling station for controlling communication between wireless communication terminals.

4. The wireless communication system according to claim 3, wherein the second hopping pattern is determined by said controlling station.

5. The wireless communication system according to claim 3, wherein said information communicating means communicates independent of said controlling station.

6. The wireless communication system according to claim 1, wherein said synchronization means synchronizes on the basis of synchronizing information included in the control information.

7. The wireless communication system according to claim 1, wherein said communication information includes audio information.

8. The wireless communication system according to claim 1, wherein said communication information includes data information other than audio information.

9. The wireless communication system according to claim 1, wherein the first hopping pattern and the second hopping pattern are different.

10. A wireless communication apparatus of a wireless communication system which communicates communication frames including control information and communication information by using frequency hopping, said apparatus comprising:

control communicating means for communicating control information in accordance with a specified first hopping pattern of plural frequency hopping patterns which is used in a plurality of wireless communication apparatuses;

synchronization means for synchronizing the communication frames on the basis of the control information communicated by said control communicating means;

information communicating means for communicating communication information in accordance with an arbitrary second hopping pattern of the plural frequency hopping patterns, using the communication frames synchronized by said synchronization means; and control means for controlling the communication of the control information and communication information while switching over between the first hopping pattern and the second hopping pattern by said control communicating means and said information communicating means.

11. The wireless communication system according to claim 10, wherein the second hopping pattern is determined each time when performing communication.

12. The wireless communication system according to claim 10 further comprising a controlling station for controlling communication between wireless communication terminals.

13. The wireless communication system according to claim 12, wherein the second hopping pattern is determined by said controlling station.

14. The wireless communication system according to claim 12, wherein said information communicating means communicates independent of said controlling station.

15. The wireless communication system according to claim 10, wherein said synchronization means synchronizes on the basis of synchronizing information included in the control information.

16. The wireless communication system according to claim 10, wherein said communication information includes audio information.

17. The wireless communication system according to claim 10, wherein said communication information includes data information other than audio information.

18. The wireless communication system according to claim 10, wherein the first hopping pattern and the second hopping pattern are different.

19. A control method of a wireless communication system including a plurality of wireless communication apparatuses which communicate communication frames including control information and communication information by using frequency hopping, said method comprising:

a control communicating step of communicating control information in accordance with a specified first hopping pattern of plural frequency hopping patterns, which is used in said plurality of wireless communication apparatuses;

a synchronization step of synchronizing the communication frames on the basis of the control information communicated in said control communicating step;

an information communicating step of communicating communication information in accordance with an arbitrary second hopping pattern of the plural frequency patterns, using the communication frames synchronized in said synchronization step; and a control step of controlling communication of the control information and communication information while switching over between the first hopping pattern and the second hopping pattern in said control communicating step and said information communicating step.

20. The control method according to claim 19, wherein the second hopping pattern is determined each time when performing communication.

21. The control method according to claim 19, wherein said wireless communication system has a controlling station for controlling communication between wireless communication terminals.

22. The control method according to claim 21, wherein the second hopping pattern is determined by said controlling station.

23. The control method according to claim 21, wherein, at said information communicating step, communication is performed independent of said controlling station.

24. The control method according to claim 19, wherein said synchronization step includes synchronizing on the basis of synchronization information included in the control information.

25. The control method according to claim 19, wherein said communication information includes audio information.

26. The control method according to claim 19, wherein said communication information includes data information other than audio information.

27. The control method according to claim 19, wherein, the first hopping pattern and the second hopping pattern are different.

28. A control method of a wireless communication apparatus of a wireless communication system which communicates communication frames including control information and communication information by using frequency hopping, said method comprising:

a control communicating step of communicating control information in accordance with a specified first hopping pattern of plural frequency hopping patterns, which is used in a plurality of wireless communication apparatuses;

a synchronization step of synchronizing the communication frames on the basis of the control information communicated in said control communicating step;

an information communicating step of communicating communication information in accordance with an arbitrary second hopping pattern of the plural frequency hopping patterns, using the communication frames synchronized in said synchronization step; and a control step of controlling communication of the control information and communication information while switching over between the first hopping pattern and the second hopping pattern in said control communicating step and said information communicating step.

29. The control method according to claim 28, wherein the second hopping pattern is determined each time when performing communication.

30. The control method according to claim 28, wherein said wireless communication system has a controlling station for controlling communication between wireless communication terminals.

31. The control method according to claim 30, wherein the second hopping pattern is determined by said controlling station.

32. The control method according to claim 30, wherein, at said information communicating step, communication is performed independent of said controlling station.

33. The control method according to claim 28, wherein said synchronization step includes synchronizing on the basis of synchronization information included in the control information.

34. The control method according to claim 28, wherein said communication information includes audio information.

35. The control method according to claim 28, wherein said communication information includes data information other than audio information.

36. The control method according to claim 28, wherein the first hopping pattern and the second hopping pattern are different.

* * * * *

UNITED STATES PATENT AND TRADEMARK OFFICE
CERTIFICATE OF CORRECTION

PATENT NO. : 5,870,391

DATED : February 9, 1999

INVENTOR(S): HIDETADA NAGO

It is certified that error appears in the above-identified patent and that said Letters Patent is hereby corrected as shown below:

COLUMN 1

Line 25, "information; alternatively" should read
--information,-- and "information," should read
--information; alternatively,--;
Line 64, "the" should be deleted.

COLUMN 2

Line 26, "on" should read --on the--.

COLUMN 3

Line 24, "signing" should read --assigning--;
Line 55, "Note," should read --Note--.

COLUMN 4

Line 8, "burstly" should read --in bursts--;
Line 12, "as," should read --as--;
Line 13, "devices," should read --devices--.

COLUMN 5

Line 38, "occurred" should read --occurring--;
Line 42, "an error" should read --the error that has--;
Line 43, "mathematical" should read --a mathematical--
Line 44, "error" should read --error that has--;
Line 55, "a" should be deleted.

UNITED STATES PATENT AND TRADEMARK OFFICE
CERTIFICATE OF CORRECTION

PATENT NO. : 5,870,391

DATED : February 9, 1999

INVENTOR(S): HIDETADA NAGO

It is certified that error appears in the above-identified patent and that said Letters Patent is hereby corrected as shown below:

COLUMN 8

Line 42, "the" should read --that the--.

COLUMN 9

Line 5, "not" should read --not change--;
Line 54, "and" should read --and the--.

COLUMN 10

Line 9, "terminal controls" should read --does the terminal control--;
Line 32, "thereafter," should read --and is thereafter--;
Line 48, "which" should read --which has been--;
Line 64, "detects" should read --detect--.

COLUMN 11

Lines 41, 42, "when a terminal request" should read --for when a terminal requests--;
Line 45, "13," should read --13, the--.

UNITED STATES PATENT AND TRADEMARK OFFICE
CERTIFICATE OF CORRECTION

PATENT NO. : 5,870,391

DATED : February 9, 1999

INVENTOR(S): HIDETADA NAGO

It is certified that error appears in the above-identified patent and that said Letters Patent is hereby corrected as shown below:

COLUMN 12

Line 15, "terminal" should read --the terminal--;
Line 32, "hopping or" should read -- or --;
Line 48, "temporality" should read --temporarily--;
Line 50, "temporally" should read --temporarily--;
Line 65, "when" should read --when the--.

COLUMN 13

Line 15, "then" should read --it then--;
Line 25, "of" should read --the--;
Line 52, "from" should read --from the--;
Line 65, "is" should read --it--.

COLUMN 14

Line 4, "notifies" should read --notifying--;
Line 53, "data," should read --data, the--;
Line 54, "If" should read --If the--; and "determined" should read --determines--;
Line 67, "referred" should read --referred to--.

UNITED STATES PATENT AND TRADEMARK OFFICE
CERTIFICATE OF CORRECTION

PATENT NO. : 5,870,391

DATED : February 9, 1999

INVENTOR(S): HIDETADA NAGO

It is certified that error appears in the above-identified patent and that said Letters Patent is hereby corrected as shown below:

COLUMN 15

Line 10, "transmits" should read --transmit--;
Line 12, "transmits" should read --transmit--;
Line 32, "transmits" should read --transmit--;
Line 48, "terminal" should read --terminals--.

COLUMN 16

Line 8, "communicates" should read --communicate--;
Line 22, "Further," should read --Further, a--;
Line 26, "independent" should read --independently--;
Line 36, "appraise" should read --apprise--.

COLUMN 17

Line 2, "1" should read --1,--;
Line 8, "independent" should read --independently--;
Line 52, "10" should read --10,--;
Line 60, "independent" should read --independently--.

COLUMN 18

Line 40, "independent" should read --independently--;
Line 43, "synchronization" should read --synchronizing--;
Line 51, "wherein," should read --wherein--.

UNITED STATES PATENT AND TRADEMARK OFFICE
CERTIFICATE OF CORRECTION

PATENT NO. : 5,870,391

DATED : February 9, 1999

INVENTOR(S): HIDETADA NAGO

It is certified that error appears in the above-identified patent and that said Letters Patent is hereby corrected as shown below:

<u>COLUMN 20</u>

Line 3, independent" should read --independently--;
Line 6, "synchronization" should read --synchronizing--.

Signed and Sealed this

Fifteenth Day of February, 2000

Attest:

Q. TODD DICKINSON

Attesting Officer      Commissioner of Patents and Trademarks